US010677242B2

United States Patent
Nahidino et al.

(10) Patent No.: US 10,677,242 B2
(45) Date of Patent: Jun. 9, 2020

(54) PUMP CHEMICAL COMPATIBILITY MANAGEMENT SYSTEM

(71) Applicant: Ecolab USA Inc., Saint Paul, MN (US)

(72) Inventors: Massoud Nahidino, Traunstein (DE); Martin Schweble, Siegsdorf (DE)

(73) Assignee: Ecolab USA Inc., Saint Paul, MN (US)

( * ) Notice: Subject to any disclaimer, the term of this patent is extended or adjusted under 35 U.S.C. 154(b) by 0 days.

(21) Appl. No.: 16/276,822

(22) Filed: Feb. 15, 2019

(65) Prior Publication Data

US 2019/0257305 A1    Aug. 22, 2019

Related U.S. Application Data

(60) Provisional application No. 62/633,422, filed on Feb. 21, 2018.

(51) Int. Cl.
*G06F 17/00* (2019.01)
*F04B 49/10* (2006.01)
(Continued)

(52) U.S. Cl.
CPC .............. *F04B 49/10* (2013.01); *F04B 15/04* (2013.01); *G06F 16/2455* (2019.01);
(Continued)

(58) Field of Classification Search
CPC ........................... G06F 19/3468; G06Q 50/06
(Continued)

(56) References Cited

U.S. PATENT DOCUMENTS 5,601,413 A    2/1997 Langley et al.
6,148,838 A    11/2000 Tsay et al.
(Continued)

FOREIGN PATENT DOCUMENTS

AT    512688 A1    10/2013
CN    103083750 A    5/2013
(Continued)

OTHER PUBLICATIONS

International Patent Application No. PCT/US2019/018152, International Search Report and Written Opinion dated Jun. 3, 2019, 14 pages.

*Primary Examiner* — Jamara A Franklin
(74) *Attorney, Agent, or Firm* — Fredrikson & Byron, P.A.

(57) ABSTRACT

Techniques for managing chemical pumps and chemical compositions are disclosed. A system may include a chemical pump that is exposed to a chemical composition during operation of the chemical pump; a chemical reservoir containing the chemical composition, the chemical reservoir including an electronically readable medium including embedded information corresponding to the chemical composition; and a database comprising chemical compatibility data between the chemical composition and the chemical pump. An application executing on a portable computing device is operable to: receive a pump identifier of the chemical pump; electronically read the electronically readable medium to obtain, based on the embedded information, a chemical identifier of the chemical composition; query the database using the chemical identifier and the pump identifier; receive, from the database, a chemical compatibility between the chemical composition and the chemical pump; and output an indication corresponding to the chemical compatibility between the chemical composition and the chemical pump.

21 Claims, 5 Drawing Sheets

(51) Int. Cl.
  *G06F 16/2455* (2019.01)
  *F04B 15/04* (2006.01)
  *G06K 7/00* (2006.01)
  *G06Q 10/10* (2012.01)

(52) U.S. Cl.
  CPC ......... *G06K 7/0004* (2013.01); *G06Q 10/101* (2013.01); *F05C 2225/04* (2013.01); *F05C 2225/12* (2013.01); *F05C 2231/00* (2013.01)

(58) Field of Classification Search
  USPC .................. 235/375; 705/413; 222/1; 417/53
  See application file for complete search history.

(56) References Cited

U.S. PATENT DOCUMENTS

| | | | |
|---|---|---|---|
| 6,879,876 | B2 | 4/2005 | O'Dougherty et al. |
| 7,237,577 | B1 | 7/2007 | Yacko et al. |
| 7,747,344 | B2 | 6/2010 | O'Dougherty et al. |
| 8,240,508 | B2 | 8/2012 | Wegelin et al. |
| 9,162,863 | B2 | 10/2015 | Till |
| 2003/0135388 | A1 | 7/2003 | Martucci et al. |
| 2005/0277890 | A1* | 12/2005 | Stewart ............... G06F 19/3468 604/189 |
| 2007/0044820 | A1 | 3/2007 | Chan et al. |
| 2007/0128048 | A1 | 6/2007 | Gonnella et al. |
| 2009/0069947 | A1 | 3/2009 | Newman |
| 2010/0024915 | A1 | 2/2010 | Thomas et al. |
| 2010/0089943 | A1 | 4/2010 | Till |
| 2010/0146587 | A1 | 6/2010 | Sholes et al. |
| 2010/0312401 | A1 | 12/2010 | Gutierrez et al. |
| 2011/0000923 | A1 | 1/2011 | Morales |
| 2011/0082595 | A1 | 4/2011 | Mehus et al. |
| 2012/0160868 | A1 | 6/2012 | Pallante et al. |
| 2014/0136366 | A1 | 5/2014 | Carroll et al. |
| 2017/0008754 | A1 | 1/2017 | Schweble et al. |
| 2017/0289824 | A1 | 10/2017 | Figoli et al. |

FOREIGN PATENT DOCUMENTS

| | | |
|---|---|---|
| DE | 29902967 U1 | 6/1999 |
| JP | S60148497 A | 8/1985 |
| JP | S63162470 A | 7/1988 |
| JP | 2005178899 A | 7/2005 |
| JP | 2006107075 A | 4/2006 |
| WO | 2006110714 A2 | 10/2006 |
| WO | 2012117413 A1 | 9/2012 |

\* cited by examiner

ERM = Electronically Readable Medium

PUMP CHEMICAL COMPATIBILITY MANAGEMENT SYSTEM

This application claims priority to U.S. Provisional Patent Application No. 62/633,422, filed Feb. 21, 2018, the entire contents of which are incorporated herein by reference.

TECHNICAL FIELD

This disclosure generally relates to chemical pumps and chemical compositions pumped by chemical pumps.

BACKGROUND

Chemical pumps are used in a variety of industries to pump chemical compositions for various purposes. In some instances, a facility may use multiple chemical compositions pumped by different pumps. Each chemical pump may have a variety of internal components that may or may not be compatible with different chemical compositions used within the facility. If the wrong chemical composition is supplied to a pump, the chemical may degrade or destroy the chemically incompatible components of the pump. This can reduce the service life of the pump, render the pump inoperable and/or contaminate the chemical being pumped.

SUMMARY

In general, this disclosure is directed to systems and techniques for checking chemical compatibility between a chemical composition and components of one or more chemical pumps. An electronically readable medium, such as a bar code, may be attached to a reservoir containing a chemical composition. A software application executing on a portable computing device may receive a selection of a chemical pump. The software application may electronically read the electronically readable medium of the reservoir to obtain embedded information regarding the chemical composition. The software application may use the selected chemical pump and the embedded information regarding the chemical composition to request information regarding the chemical compatibility of the chemical pump and the chemical composition. Based on the chemical compatibility information, the software application can inform the user whether the chemical composition may be used in the chemical pump.

In practice, for example, an operator may be tasked with supplying one of multiple different types of chemicals in inventory to one of multiple different pumps used at an operating site. To help prevent an operator from inadvertently supplying a chemical to a pump having one or more components that are chemically incompatible with such chemical, a chemical compatibility software system may be implemented according to the disclosure. The operator may manipulate a portable user device, such as a smart phone or tablet computer, to select a pump that the operator is intending to supply with a fresh reservoir of chemical. The operator may further use a non-contact reader associated with the portable electronic device to read electronically readable information associated with a chemical reservoir intended to be supplied to the selected pump. Software executing on one or more processors associated with the portable electronic device, a remote server, and/or other computing device can compare the chemical compatibility of one or more components of the selected pump to the chemical in the chemical reservoir intended to be supplied to the selected pump. If the chemical is determined to be compatible with the selected pump, the user may be informed of the compatibility via the portable user device. Additionally or alternatively, electrical and/or mechanical lock out features that would otherwise prevent an operator from supplying the chemical to the selected pump may be unlocked. By contrast, if the chemical is determined to be incompatible with one or more components of the selected pump, the user may be informed of the incompatibility via the portable user device. Additionally or alternatively, electrical and/or mechanical lock out features may be engaged or prevented from unlocking to prevent an operator from supplying the chemical to the selected pump.

In a first embodiment, a system is described that includes: a chemical pump including at least one component that is exposed to a chemical composition being pumped during operation of the chemical pump; a chemical reservoir containing the chemical composition, the chemical reservoir including an electronically readable medium including embedded information corresponding to the chemical composition; and a database including chemical compatibility data including a compatibility between the chemical composition and the at least one component. The embodiment further includes an application executing on a portable computing device that is operable to: receive, via a first input device of the portable computing device, a selection including a pump identifier of the chemical pump; electronically read, using a second input device of the portable computing device, the electronically readable medium to obtain, based on the embedded information, a chemical identifier corresponding to the chemical composition in the chemical reservoir; query the database using the chemical identifier and the pump identifier; receive a response to the query from the database, the response including a chemical compatibility between the chemical composition in the chemical reservoir and the at least one component of the chemical pump; and output, via an output device of the portable computing device, an output indication corresponding to the chemical compatibility between the chemical composition in the chemical reservoir and the chemical pump.

In a second embodiment, the subject matter of the first embodiment is configured where the database is included in at least one of the chemical pump and the portable computing device.

In a third embodiment, the subject matter of the second embodiment is configured where the chemical pump includes a first wireless communications device; where the portable computing device includes a second wireless communications device; and where the chemical pump and the portable computing device communicate via the first and second wireless communications devices, respectively, via a wireless communications protocol compatible with both the first and second wireless communications devices.

In a fourth embodiment, the subject matter of first through third embodiments is configured where the output indication includes at least one of: an indication that the chemical pump and the chemical composition are compatible; an indication that the at least one component of the chemical pump and the chemical composition are incompatible; and an indication that using the chemical composition in the chemical pump may cause a service life of the chemical pump to be reduced.

In a fifth embodiment, the subject matter of the first through fourth embodiments is configured where the database is stored in at least one server located remotely from both the chemical pump and the portable computing device.

In a sixth embodiment, the subject matter of first through fifth embodiments is configured where the at least one component is selected from the group consisting of a seal, a gasket, an O-ring, and combinations thereof.

In a seventh embodiment, the subject matter of the first through sixth embodiments is configured where the electronically readable medium is a scannable image; and where the second input device of the portable computing device is an optical input device.

In an eight embodiment, the subject matter of the seventh embodiment is configured where the scannable image is at least one of a two-dimensional barcode and a three-dimensional barcode.

In a ninth embodiment, the subject matter of the first through eight embodiments is configured where the electronically readable medium is a radio-frequency identification (RFID) tag; and where the second input device of the portable computing device is an RFID reader.

In a tenth embodiment, the subject matter of the first through ninth embodiments is configured where the embedded information corresponds to at least one of: an amount of the chemical composition in the chemical reservoir; and a concentration of the chemical composition in the chemical reservoir.

In an eleventh embodiment, the subject matter of the first through tenth embodiments is configured where the portable computing device is a smartphone, and where both the first input device and the output device is a touchscreen of the smartphone.

In a twelfth embodiment, the subject matter of the first through eleventh embodiments is configured where the application is further operable to: receive operating information from the chemical pump; and display the operating information on the output device of the portable computing device.

In a thirteenth embodiment, the subject matter of the first through twelfth embodiments is configured where the chemical reservoir includes multiple reservoirs, each respective reservoir of the multiple reservoirs including a respective chemical composition and a respective electronically readable medium.

In a fourteenth embodiment, the subject matter of the first through thirteenth embodiments is configured where the at least one component is fabricated from a material selected from the group consisting of: polyvinyl chloride, polyethylene, polypropylene, polyvinylidene fluoride, polytetrafluoroethylene, polyether ether ketone, and combinations thereof and where the chemical composition is selected from the group consisting of an alkali metal hydroxide, an alkali metal hypochlorite, a peroxide, a mineral acid, an organic acid, a surfactant, and combinations thereof.

In a fifteenth embodiment, the subject matter of off the fourth through fourteenth embodiments is configured where the application is operable to communicate with the chemical pump to cause the chemical pump to prevent an additional volume of the chemical composition from being introduced into the chemical pump.

In a sixteenth embodiment, the subject matter of the first through fifteenth embodiments is configured where the at least one component includes multiple components, each respective component of the multiple components being fabricated from a respective material; where the query is to determine the chemical compatibility of each respective material to the chemical composition; and when any component of the multiple components is determined to not be compatible with the chemical composition, the output indication is that the chemical pump is not compatible with the chemical composition.

In a seventeenth embodiment a non-transitory computer-readable medium is described that includes instructions that, when executed by a portable computing device, cause a portable computing device to: receive, via a first input device of a portable computing device, a selection including a pump identifier of a chemical pump including at least one component; electronically read, using a second input device of the portable computing device, an electronically readable medium including embedded information corresponding to a chemical composition stored in a chemical reservoir, to obtain, based on the embedded information, a chemical identifier corresponding to the chemical composition in the chemical reservoir. The instructions are further configured to cause the portable computing device to: query, using the chemical identifier and the pump identifier, a database including chemical compatibility data; receive a response to the query from the database, the response including a chemical compatibility between the chemical composition in the chemical reservoir and the at least one component of the chemical pump; and output, via an output device of the portable computing device, an output indication corresponding to the chemical compatibility between the chemical composition stored in the chemical reservoir and the chemical pump.

In an eighteenth embodiment, the subject matter of the seventeenth embodiment is configured where the portable computing device is a smartphone, and where both the first input device and the output device is a touchscreen of the smartphone.

In a nineteenth embodiment, the subject matter of the seventeenth and eighteenth embodiments is configured where the electronically readable medium is a scannable image; and where the second input device of the portable computing device is an optical input device.

In a twentieth embodiment, the subject matter of the nineteenth embodiment is configured where the scannable image is at least one of a two-dimensional barcode and a three-dimensional barcode.

In a twenty-first embodiment, a method is described that includes receiving, from a portable computing device, a pump identifier identifying a chemical pump including at least one component, the pump identifier corresponding to a selection received via a first input device of the portable computing device. The method also includes receiving, from the portable computing device, a chemical identifier identifying a chemical reservoir storing a chemical composition, the chemical identifier corresponding to an input received via a second input device of the portable computing device. The method further includes querying, using the pump identifier and the chemical identifier, a database including chemical compatibility data including a compatibility between at least one component of the chemical pump and the chemical composition in the chemical reservoir. Additionally, the method includes receiving a response to the query from the database, the response including the compatibility between the at least one component of the chemical pump and the chemical composition in the chemical reservoir, and transmitting the compatibility to the portable computing device.

In a twenty-second embodiment, the subject matter of the twenty-first embodiment is configured where the method is performed by the chemical pump.

In a twenty-third embodiment, the subject matter of the twenty-first and twenty-second embodiments is configured where the method is performed by a server that is remote from both the chemical pump and the portable computing device.

In a twenty-fourth embodiment, the subject matter of the twenty-first through twenty-third embodiments is configured where the database is remote from both the chemical pump and the portable computing device.

In a twenty-fifth embodiment, the subject matter of the twenty-second through twenty-fourth embodiments is configured where the chemical pump and the portable computing device communicate via a Bluetooth wireless communications protocol.

A twenty-sixth embodiment is at least one machine-readable medium including instructions that, when executed by processing circuitry, cause the processing circuitry to perform operations to implement of any of the first through twenty-fifth embodiments.

A twenty-seventh embodiment is an apparatus including means to implement of any of the first through twenty-fifth embodiments.

A twenty-eighty embodiment is a system to implement of any of the first through twenty-fifth embodiments.

A twenty-ninth embodiment is a method to implement of any of the first through twenty-fifth embodiments.

BRIEF DESCRIPTION OF THE DRAWINGS

The following drawings are illustrative of particular embodiments of the present invention and therefore do not limit the scope of the invention. The drawings are intended for use in conjunction with the explanations in the following description. Embodiments of the invention will hereinafter be described in conjunction with the appended drawings, wherein like numerals denote like elements.

DETAILED DESCRIPTION

The following detailed description is exemplary in nature and is not intended to limit the scope, applicability, or configuration of the invention in any way. Rather, the following description provides some practical illustrations for implementing exemplary embodiments of the present invention. Examples of constructions, materials, and/or dimensions are provided for selected elements. Those skilled in the art will recognize that many of the noted examples have a variety of suitable alternatives.

Although a chemical pump that is capable of dispensing multiple chemical compositions is useful, various chemical compositions may affect the pump in various ways. For example, a pump may have various internal parts (e.g., seals, gaskets, O-rings, etc.) that may deteriorate when exposed to certain chemical compositions. Furthermore, a pump may have some internal parts that are more susceptible to deterioration than other parts. A typical operator looking to supply a pump with chemical to be pumped would not be aware of the materials forming the internal components of the pump or their compatibility with the chemical intended to be pumped.

Figure 1:
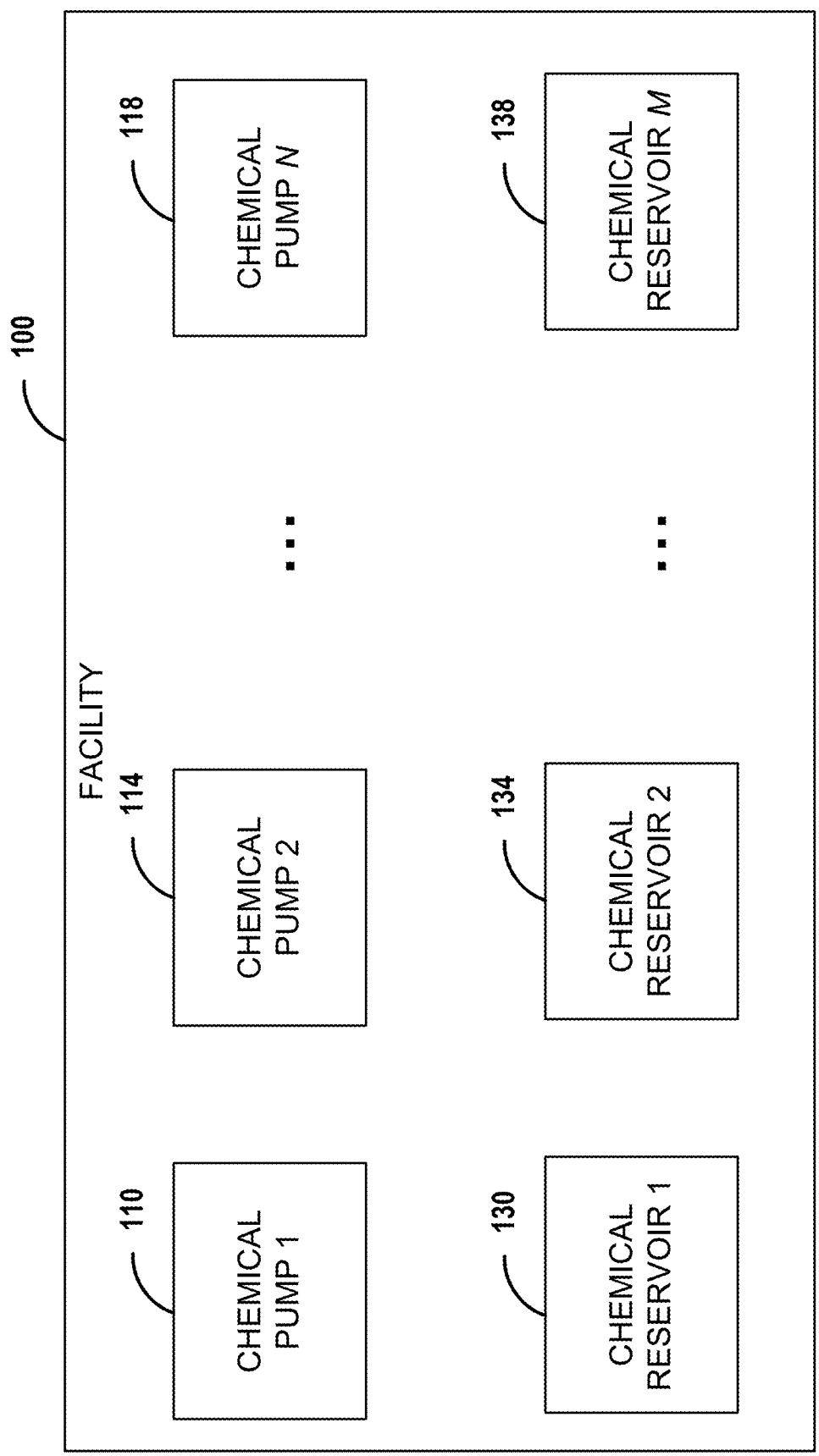
FIG. 1 illustrates a common industrial operating environment, according to an example embodiment.

FIG. 1 illustrates a common industrial operating environment 100, according to an example embodiment. The industrial operating environment 100 may comprise one or more chemical pumps 110-118 and one or more chemical reservoirs 130-138. Some of the chemical pumps 110-118 may be of the same type/model, and some of the chemical reservoirs 130-138 may hold the same type of chemical composition. However, at least one of the chemical pumps 110-118 may have one or more components that have a different chemical compatibility than at least one other of the chemical pumps 110-118. Likewise, at least one of the chemical reservoirs 130-138 may hold a different chemical composition than at least one other of the chemical reservoirs 130-138.

Each chemical pump may have one or more components (e.g., seals, gaskets, O-rings, pump housing, etc.) that come into contact with chemical being pumped. The components may come into contact with the chemical being pumped in that an external surface of each contacted component may be wetted with the chemical being pumped, e.g., during the pumping process and/or after cessation of pumping when residual chemical is still within the pump. Such components may, but need not, be internal to the pump housing. In either case, if the chemical being pumped is incompatible with a contacted component, the contacted component may degrade at a rate fasted than the expected service life of the component. This may prematurely render the pump inoperable. For this reason, the component may be designated as being chemically incompatible with the chemical being pumped. Based on its internal component(s), a chemical pump 110-118 may be approved for use with some chemical compositions, but other chemical compositions may be prohibited. Some chemical compositions may be approved for use with the chemical pump 110-118, but will reduce the service life of the chemical pump 110-118 faster than other approved chemicals.

While a component of a chemical pump (e.g., pumps 110-118) according to the disclosure can be fabricated from any suitable material, example materials include metals (e.g., stainless steel, titanium) and polymeric materials. Example polymeric materials that may be used to form one or more components of a pump contacted with chemical being pumped include, but are not limited to, polyvinyl chloride, polyethylene, polypropylene, polyvinylidene fluoride, polytetrafluoroethylene, polyether ether ketone, and combinations thereof.

Similarly, while a chemical reservoir (e.g., reservoirs 130-138) according to the disclosure can hold any desired type of chemical, example chemicals that may be held in one or more reservoirs include, but are not limited to, an alkali metal hydroxide, an alkali metal hypochlorite, a peroxide, a mineral acid, an organic acid, a surfactant, and combinations thereof. The chemical held in a particular reservoir may be incompatible with materials used to fabricate one or more components in a pump. For example, in certain situations, an alkali metal hydroxide may be incompatible with a component made of polyvinyl chloride or polyvinylidene fluoride. As another example, a peroxide may, in certain situations, be incompatible with a component made of polypropylene. As a further example, nitric acid ($HNO_3$) may, in certain situations, be incompatible with a component made of polyether ether ketone. As yet a further example, sodium hypochlorite may, in certain situations, be incompatible with a component made of polypropylene or polyvinylidene fluoride.

Although keeping track of the chemical compatibility for a single chemical pump 110-118 may be feasible, many industrial/commercial/manufacturing environments use many chemical pumps 110-118 and many different types of chemical compositions in their operations. Tracking the chemical compatibility between chemical compositions and internal components of chemical pumps 110-118 (and, therefore, the chemical pumps 110-118 themselves) is a difficult task; tracking an expected service life value for a chemical pump 110-118 based on its internal components and the various chemical compositions to which it has been exposed is even more difficult.

Figure 2:
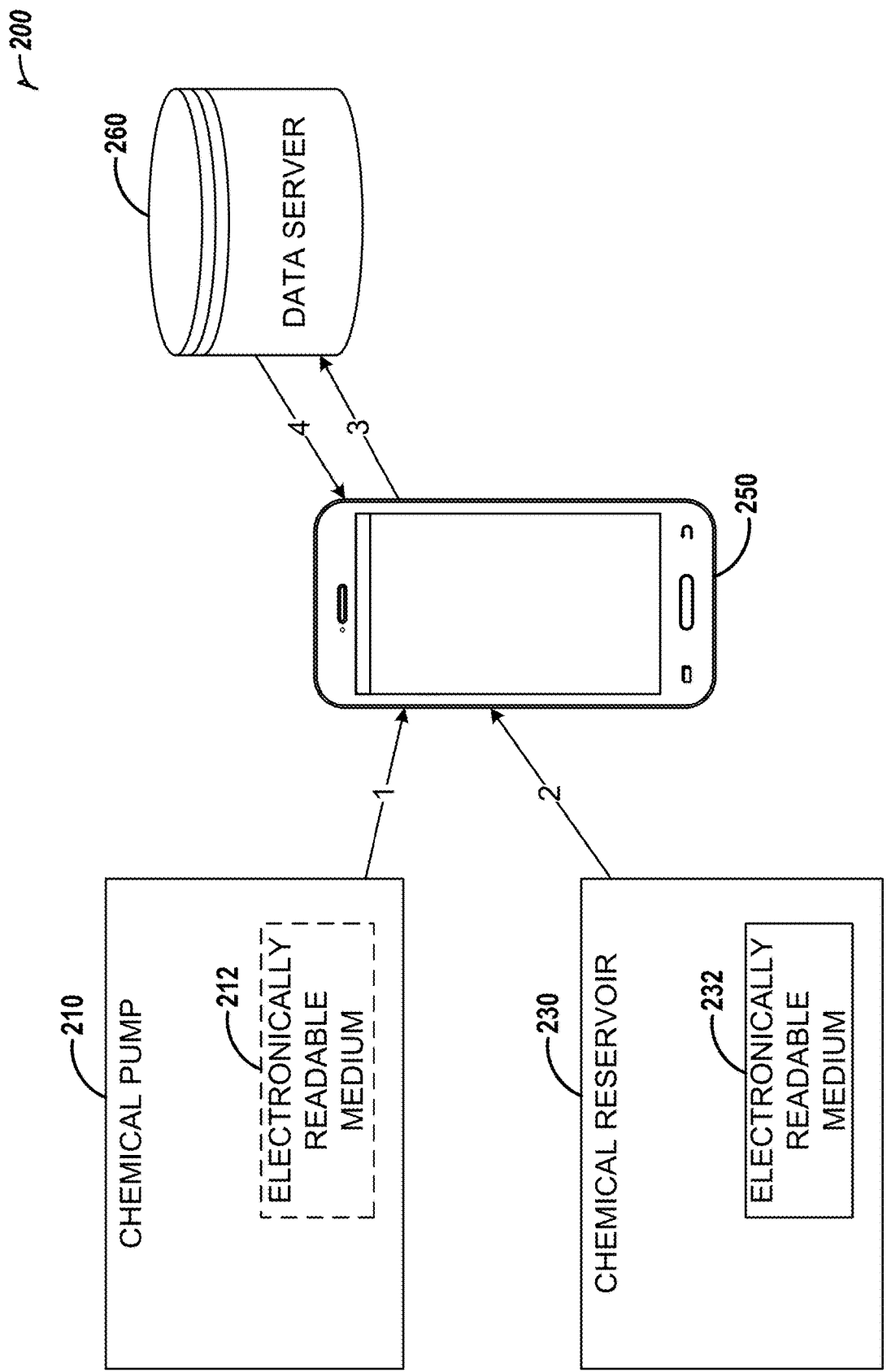
FIG. 2 illustrates a system for managing pump operations based on compatibilities between a chemical pump and a chemical composition, according to an embodiment.

FIG. 2 illustrates an example system 200 for managing pump operations based on compatibilities between a chemical pump and a chemical composition. The system 200 includes a chemical pump 210 and a chemical reservoir 230; the chemical reservoir 230 may contain an amount of a chemical composition. The system 200 may include a portable computing device 250 and a data server 260 that provides chemical compatibility data.

The portable computing device 250 may execute a software application ("app") for tracking compatibility between chemical pumps and chemical compositions. Using the app, a user may (1) select a particular chemical pump 210, (2) select a chemical reservoir 230 containing a particular chemical composition, (3) request compatibility information from the data server 260, and (4) receive compatibility information from the data server 260. Based on the compatibility information received from the data server 260, the app may inform the user one or more of the following: that the chemical composition is approved for use in the chemical pump 210, that the chemical composition may reduce the service life of the chemical pump 210, that the chemical composition is not approved for use in the chemical pump 210, that the chemical composition is prohibited from being used in the chemical pump 210, etc.

Although the portable computing device 250 illustrated in FIG. 2 is a smartphone, the portable computing device 250 may be a tablet, a bar code reader, a radio frequency identification (RFID) reader, a camera, or any portable computing device that includes one or more of these functionalities. Furthermore, although selecting a particular chemical pump 210 and selecting a chemical reservoir 230 containing a particular chemical composition are labeled as (1) and (2), respectively, these steps may be performed in either order.

To check for chemical compatibility, a particular chemical pump 210 and a chemical composition (or a particular chemical reservoir 230 containing the chemical composition) may need to be selected within the app. The particular chemical pump 210 may be selected within the app in various ways. For example, a user may use the user interface (UI) of the app to select the particular chemical pump 210 from a set of chemical pumps presented within the UI of the app. As another example, a user may use the UI of the app to enter identifying information (e.g., a unique identification number, a brand or model number, a location, etc.) for the particular chemical pump 210 into the app. In an embodiment, the UI of the app is presented on a touchscreen of the portable computing device 250.

In some examples, the particular chemical pump 210 may include an electronically-readable medium 212, such as a bar code (e.g., a two-dimensional bar code, a three-dimensional bar code, a QR code, etc.), an RFID tag (e.g., a passive RFID tag, an active RFID tag, etc.), or an image/text that uniquely identifies the particular chemical pump 210. In such an embodiment, the particular chemical pump 210 may be selected within the app by electronically reading the electronically readable medium 212 using a corresponding input device of the portable computing device 250. For example, if the electronically readable medium 212 is a bar code, the input device may be an optical input device such as a camera or a bar code reader, if the electronically readable medium 212 is an RFID tag, the input device may be an RFID reader, etc.

The chemical composition (or the particular chemical reservoir 230 containing the chemical composition) may be selected within the app in various ways. For example, a user may use the user interface (UI) of the app to select the chemical composition (or the particular chemical reservoir 230 containing the chemical composition) from a set of chemical compositions (or a set of particular chemical reservoirs containing the chemical composition) presented within the UI of the app. As another example, a user may use the UI of the app to enter identifying information (e.g., a unique identification number, a brand/model number combination, etc.) for the chemical composition (or for the particular chemical reservoir 230 containing the chemical composition).

In some examples, a particular chemical reservoir 230 may include an electronically readable medium 232, such as a bar code (e.g., a two-dimensional bar code, a three-dimensional bar code, a QR code, etc.), an RFID tag (e.g., a passive RFID tag, an active RFID tag, etc.), or an image/text that uniquely identifies the particular chemical reservoir 232. In such an embodiment, the particular chemical reservoir 230 may be selected within the app by electronically reading its corresponding electronically readable medium 232. In an embodiment, the electronically readable medium 232 includes embedded information; the app may need to use this embedded information to retrieve (e.g., from a data server) additional information about the chemical composition (or the particular chemical reservoir 230 containing the chemical composition) selected. For example, if a particular chemical reservoir 230 was selected, the app may need to determine what chemical composition the particular chemical reservoir 230 contains. In an embodiment, the embedded information may correspond to at least one of a type of chemical in the particular chemical reservoir, an amount of the chemical in the particular chemical reservoir 230, and/or a concentration of the chemical in the particular chemical reservoir 230.

After receiving selections for both the particular chemical pump 210 and the chemical composition (or the particular chemical reservoir 230 containing the chemical composition), the app may retrieve information regarding the compatibility of the particular chemical pump 210 with the chemical composition. In an embodiment, the retrieval may involve the app using the information identifying the particular chemical pump 210 and the chemical composition (or the particular chemical reservoir 230 containing the chemical composition) to request information from a data server 260 (e.g., a database, a flat file, a web service front-end to a data store, etc.). In an embodiment, the data server 260 is located in at least one of the portable computing device 250, the particular chemical pump 210, and a computing device that is external to both the portable computing device 250 and the particular chemical pump 210. In an embodiment, if the data server 260 is not located in the portable computing device 250, the app may use a wireless communications device of the portable computing device 250 to communicate with the data server 260.

After receiving the information identifying the particular chemical pump 210 and the chemical composition (or the particular chemical reservoir 230 containing the chemical composition), the data server 260 may retrieve compatibility data based on the identifying information. The retrieval may involve the data server 260 requesting data from a database accessible to the data server 260.

In an embodiment, the data server 260 may retrieve information regarding the components of the particular chemical pump 210. For example, for each component of the particular chemical pump 210, the data server 260 may retrieve one or more of the following: the type of the component, the material(s) in the component, a list of chemical compositions which are not compatible with the component, a list of chemical compositions to which the component has been exposed and/or the duration of the exposure, an expected service life, an expected service life remaining, and combinations thereof.

Additionally or alternatively, the data server 260 may retrieve information regarding the chemical composition. For example, the data server 260 may retrieve one or more of the following: a list of material types which are compatible with the chemical composition, a list of material types that are not compatible with the chemical composition, a list of chemical pump types that are compatible with the chemical composition, a list of chemical pump types that are not compatible with the chemical composition, and combinations thereof.

The data server 260 may use the retrieved information for the particular chemical pump 210 (and/or its components) and the retrieved information for the chemical composition to determine compatibility between one or more components (and, optionally, all) of the particular chemical pump 210 and the chemical composition. For example, the data server 260 may cross-reference the information for the components of the particular chemical pump 210 with the information for the chemical composition. In an embodiment, if at least one component of the particular chemical pump 210 is not compatible with the chemical composition, the data server 260 may determine that the particular chemical pump 210 as a whole is not compatible with the chemical composition. In an embodiment, the data server 260 returns to the app the retrieved information for the particular chemical pump 210 (and its components) and the retrieved information for the chemical composition, and the app performs the compatibility determination.

In an embodiment, if using a compatible chemical composition in the particular chemical pump 210 would reduce the expected service life remaining for a component of the particular chemical pump 210 beyond its expected service life, the data server 260 (or the app) may determine either (1) that the particular chemical pump 210 as a whole is not compatible with the chemical composition or (2) that the chemical composition is compatible, but that a warning should be issued to the user explaining that the particular chemical pump 210 would undergo accelerated deterioration if the chemical composition were to be used in that particular chemical pump 210.

The data server 260 may return to the app the retrieved information for the particular chemical pump 210 (and its components) and the retrieved information for the chemical composition. If the data server 260 performed a compatibility determination, the data server 260 may return the compatibility determination to the app in addition to (or instead of) the retrieved information used to make the compatibility determination. If the data server 260 did not perform a compatibility determination, the app may perform the compatibility determination using the retrieved information for the particular chemical pump 210 (and its components) and the retrieved information for the chemical composition.

Based on the compatibility determination (whether performed by the data server 260 or by the app), the app may present an output to the user indicating at least one of the following: an indication that the particular chemical pump 210 and the chemical composition are compatible, an indication that at least one component of the particular chemical pump 210 and the chemical composition are incompatible, an indication that the particular chemical pump 210 and the chemical composition are incompatible, and an indication that using the chemical composition in the particular chemical pump 210 may cause a service life of that particular chemical pump 210 to be reduced. In some examples, if the particular chemical pump 210 and the chemical composition are incompatible, the app may transmit a communication to that particular chemical pump 210; upon receipt of the communication, that particular chemical pump 210 may prevent an additional volume of the chemical composition from being introduced into that particular chemical pump 210.

In some examples, the app may receive operating information from a particular chemical pump 210, and may display the received operating information on an output device (e.g., a screen or touchscreen) of the portable computing device 250. Operating information may include one or more of: the chemical composition currently in the particular chemical pump 210, an amount of the chemical composition remaining in the particular chemical pump 210, a current pumping rate, a warning that the amount of the chemical composition within the particular chemical pump 210 is low, a warning that the particular chemical pump 210 is empty, etc.

In an embodiment, the app may execute within a computer that is bound to (e.g., logically associated with or physically attached to) a particular chemical pump 210. In such an embodiment, the step of selecting a particular chemical pump 210 may be optional, as the app may assume that the compatibility determination is to be performed for the particular chemical pump 210 whose associated computer is executing the app. However, in an embodiment, an app executing within a computer that is bound to a particular chemical pump 210 may nonetheless be used to make compatibility determinations for other chemical pumps.

In an embodiment where the app executes within a computer that is bound to a particular chemical pump 210, the process for selecting a particular chemical reservoir 230 by reading the reservoir's electronically readable medium 232 may be limited. For example, if the computer executing the app is not portable, then imaging or scanning a bar code of particular chemical reservoir 230 may require the user to physically manipulate the particular chemical reservoir 230 in relation to an input device (e.g., camera or bar code scanner) of the computer. As another example, if the computer executing the app is not portable, then reading an RFID tag of a particular chemical reservoir 230 may likewise require physically moving the particular chemical reservoir 230 so that the reservoir's RFID tag is within reading range of the computer's RFID reader. In such scenarios, a particular chemical reservoir 230 may be selected within the app by other mechanisms previously described (e.g., inputting the particular chemical reservoir's 230 unique code, selecting the particular chemical reservoir 230 from a list, etc.).

In an embodiment where the app executes within a computer that is bound to a particular chemical pump 210 and where the app may be used to select other chemical pumps, the process for selecting another particular chemical pump by reading the other pump's electronically readable medium may be ever more limited because many chemical pumps are stationary. For example, if the computer executing the app is not portable, then imaging or scanning another particular chemical pump's bar code may require the user to physically manipulate (e.g., move) one or both chemical pumps in relation to an input device (e.g., camera or bar code scanner) of the computer, which may not be practical. As another example, if the computer executing the app is not portable, then reading an RFID tag of another chemical pump may likewise require physically moving one or both chemical pumps so that the other chemical pump's RFID tag is within reading range of the computer's RFID reader, which again may not be practical. In such scenarios, another chemical pump may be selected within the app by other mechanisms previously described (e.g., inputting the other chemical pump's unique code, selecting the other chemical pump from a list, etc.).

In an embodiment, the app may guide the user through the process of adding, removing, or changing a chemical reservoir for a particular chemical pump 210. For example, the app may display visual (e.g., text, images, and/or video) instructions for the user, the app may cause audio instructions to be played for the user, or combinations thereof.

In an embodiment, the app may allow a user to change an operating parameter of a particular chemical pump 210 remotely. For example, the app may allow a user to change one or more of: a concentration of the chemical composition to be dispensed, a dispensing rate, etc.

Figure 3:
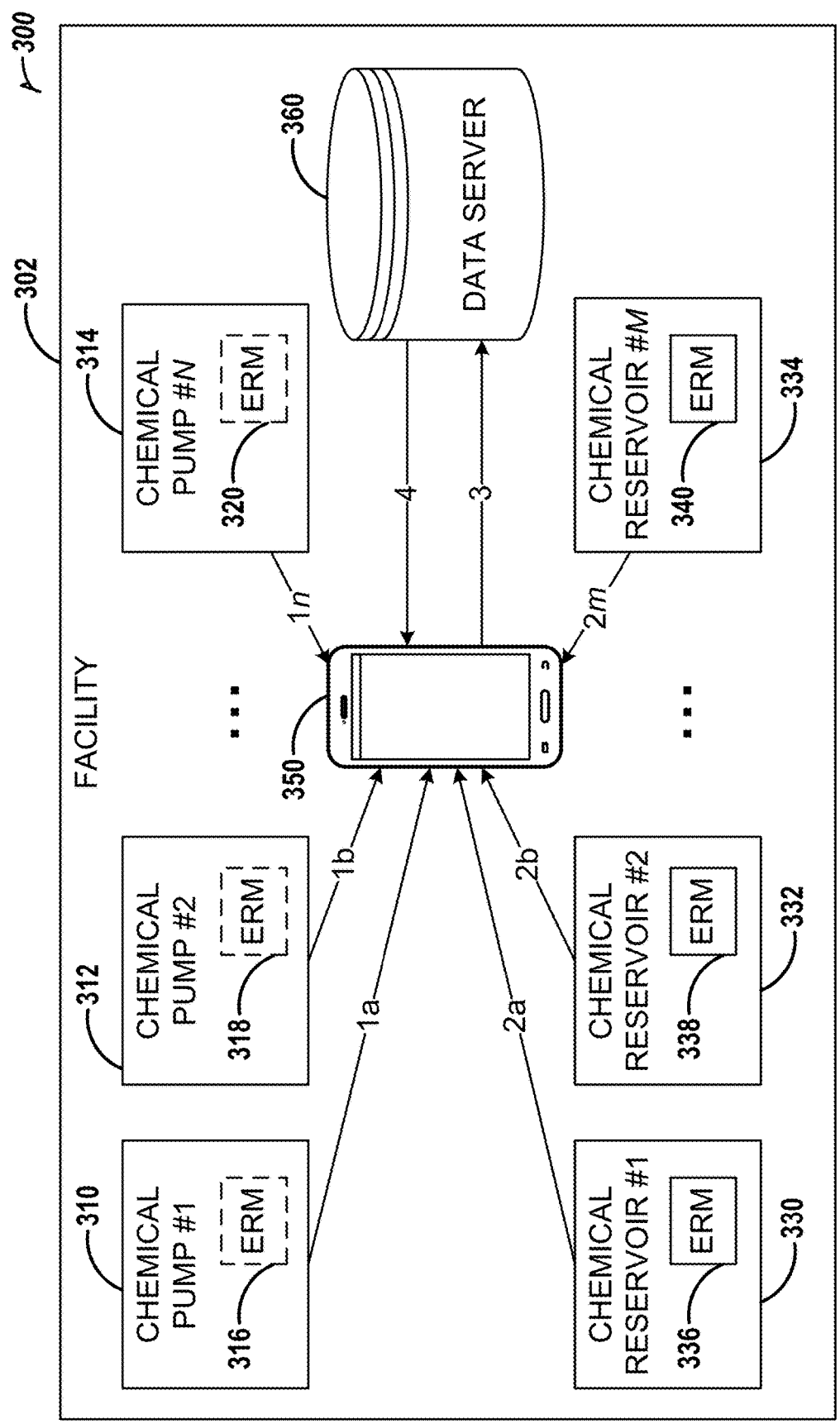
FIG. 3 illustrates a system for managing pump operations based on compatibilities between multiple chemical pumps and multiple chemical compositions, according to an embodiment.

FIG. 3 illustrates a system 300 for managing pump operations based on compatibilities between multiple chemical pumps and multiple chemical compositions, according to an embodiment. In an embodiment, the system 300 may perform the compatibility determination process for multiple chemical pumps and/or multiple chemical compositions simultaneously. For example, an example facility 302 may have at least three differing chemical pumps and at least two differing chemical compositions. Rather than performing the compatibility determination process six separate times (one for each possible combination of three chemical pumps and two chemical compositions), the system may allow the compatibility determination process to be performed for all six combinations simultaneously. To do so, the user may use the app to select the three particular chemical pumps and the two particular chemical reservoirs, request compatibility information from the data server, and receive compatibility information from the data server. The data server and/or the app may perform the compatibility determination based on the retrieved information for the particular chemical pumps (and their components) and the retrieved information for the chemical compositions.

As illustrated in FIG. 3, the system 300 may include N number of particular chemical pumps 310-314 and M number of particular chemical reservoirs 330-334, where N<M, N>M, or N=M. The compatibility determination process may be performed for one, some, or all of the particular chemical pumps 310-314 and one, some, or all of the particular chemical reservoirs 330-334. Although selecting the particular chemical pumps 310-314 and selecting the particular chemical reservoirs 330-334 are labeled as 1a-1n and 2a-2m, respectively, these steps may be performed in any order; however, only those particular chemical pumps 310-314 and particular chemical reservoirs 330-334 selected and whose information is transmitted (3) to the data server 360 will be included in the compatibility determination. Although the data server 360 is illustrated as residing within the facility 302, the data server 360 may reside (fully or partially) within one or more of a particular chemical pump 310-314, the portable computing device 350, the facility 302, and one or more locations external to the facility 302.

When multiple particular chemical pumps 310-314 and/or multiple chemical compositions (within multiple particular chemical reservoirs 330-334) are included in a compatibility determination, the compatibility determination may include optimization information. For example, a compatibility determination may be performed on chemical pump #1 310, chemical composition #1 (stored in chemical reservoir #1 330), and chemical composition #2 (stored in chemical reservoir #1 332). Chemical pump #1 310 may be compatible with both chemical composition #1 and chemical composition #2, but chemical composition #1 may be more corrosive to chemical pump #1 310 than chemical composition #2; thus, the compatibility determination may include optimization information that instructs the user to add chemical composition #2 to chemical pump #1 310. Other variables other than chemical compatibility may factor into the optimization determination (e.g., cost of the chemical composition, amount of the chemical composition in stock, expiration dates/shelf-life of the chemical composition, whether the chemical composition is substitutable with another chemical composition, etc.).

Figure 4:
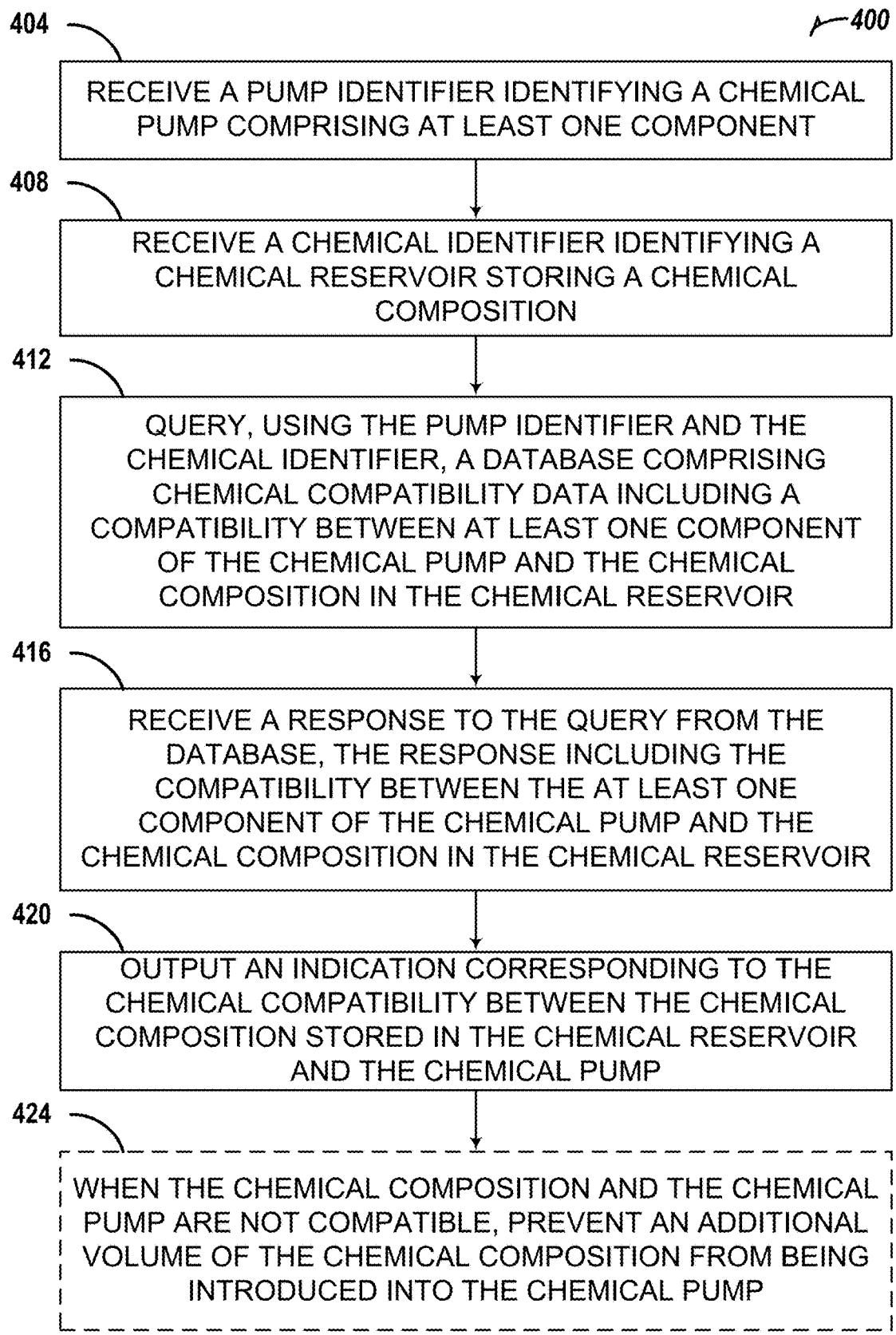
FIG. 4 is a flowchart of a method for managing pump operations based on compatibilities between chemical pumps and chemical compositions, according to an embodiment.

FIG. 4 is a flowchart of a method for managing pump operations based on compatibilities between chemical pumps and chemical compositions, according to an embodiment. A pump identifier identifying a chemical pump comprising at least one component is received (operation 404).

A chemical identifier identifying a chemical reservoir storing a chemical composition is received (operation 408).

A database, comprising chemical compatibility data including a compatibility between at least one component of the chemical pump and the chemical composition in the chemical reservoir, is queried using the pump identifier and the chemical identifier (operation 412).

A response to the query is received (operation 416) from the database, the response including the compatibility between the at least one component of the chemical pump and the chemical composition in the chemical reservoir.

An indication is outputted (operation 420), the indication corresponding to the chemical compatibility between the chemical composition stored in the chemical reservoir and the chemical pump.

Optionally, when the chemical composition and the chemical pump are not compatible, an additional volume of the chemical composition is prevented (operation 424) from being introduced into the chemical pump.

Figure 5:
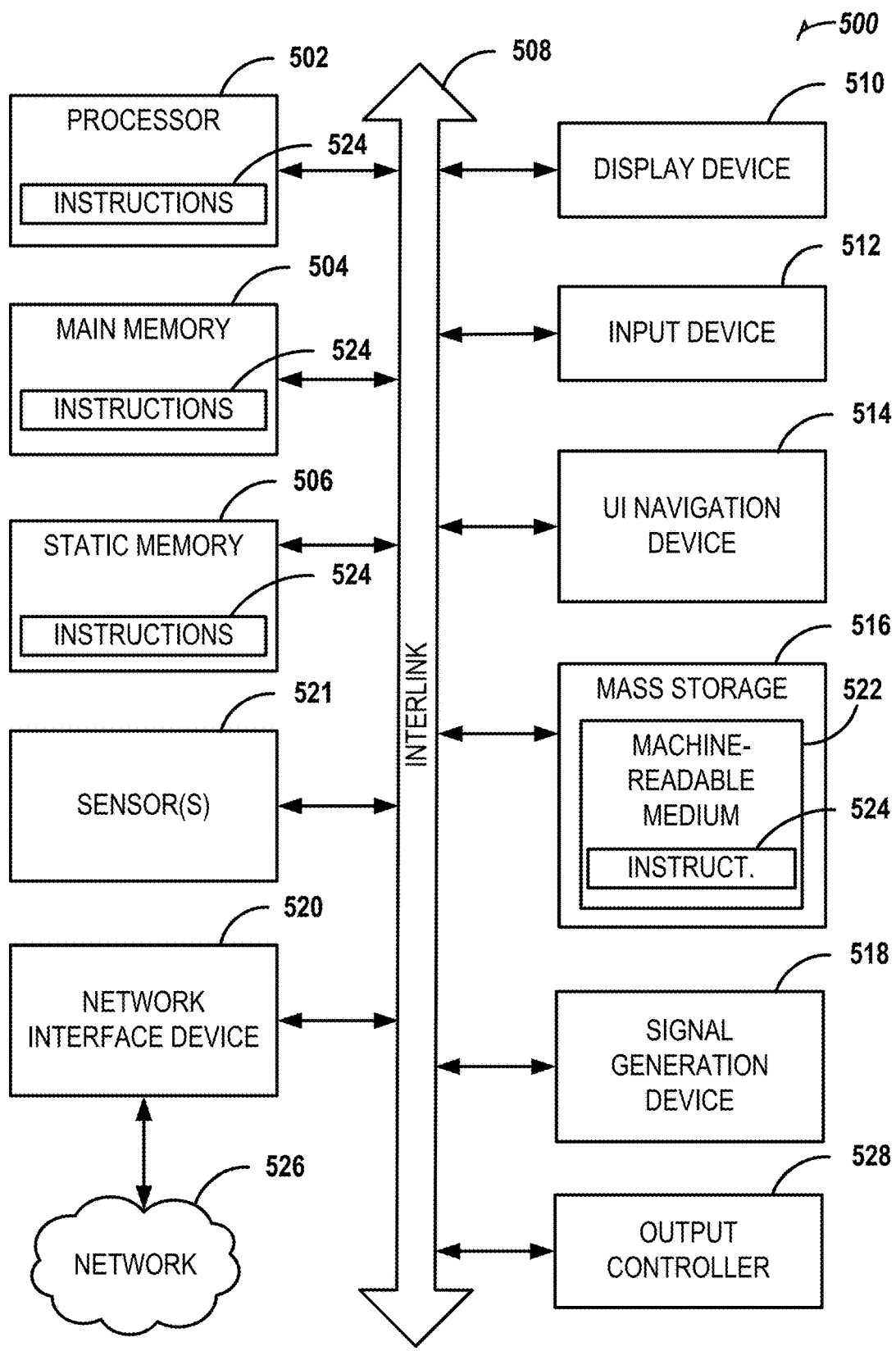
FIG. 5 is a block diagram illustrating an example of a machine, upon which any one or more example embodiments may be implemented.

FIG. 5 is a block diagram illustrating an example of a machine 500, upon which any one or more example embodiments may be implemented. In alternative embodiments, the machine 500 may operate as a standalone device or may be connected (e.g., networked) to other machines. In a networked deployment, the machine 500 may operate in the capacity of a server machine, a client machine, or both in a client-server network environment. In an example, the machine 500 may act as a peer machine in a peer-to-peer (P2P) (or other distributed) network environment. The machine 500 may implement or include any portion of the systems, devices, or methods illustrated in FIGS. 1-4, and may be a computer, a server, or any machine capable of executing instructions (sequential or otherwise) that specify actions to be taken by that machine. Further, although only a single machine is illustrated, the term "machine" shall also be taken to include any collection of machines that individually or jointly execute a set (or multiple sets) of instructions to perform any one or more of the methodologies discussed herein, such as cloud-based computing, software as a service (SaaS), other computer cluster configurations, etc.

Examples, as described herein, may include, or may operate by, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 500 may include a hardware processor 502 (e.g., a central processing unit (CPU), a graphics processing unit (GPU), a hardware processor core, or any combination thereof), a main memory 504 and a static memory 506, some or all of which may communicate with each other via an interlink (e.g., bus) 508. The machine 500 may further include a display unit 510, an alphanumeric input device 512 (e.g., a keyboard), and a user interface (UI) navigation device 514 (e.g., a mouse). In an example, the display unit 510, input device 512 and UI navigation device 514 may be a touch screen display. The machine 500 may additionally include a storage device (e.g., drive unit) 516, a signal generation device 518 (e.g., a speaker), a network interface device 520, and one or more sensors 521, such as a global positioning system (GPS) sensor, compass, accelerometer, or other sensor. The machine 500 may include an output controller 528, such as a serial (e.g., USB, parallel, or other wired or wireless (e.g., infrared (IR), near field communication (NFC), etc.) connection to communicate or control one or more peripheral devices (e.g., a printer, card reader, etc.)

The storage device 516 may include a machine-readable medium 522 on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the machine 500. In an example, one or any combination of the hardware processor 502, the main memory 504, the static memory 506, or the storage device 516 may constitute machine-readable media.

Although the machine-readable medium 522 is illustrated as a single medium, the term "machine-readable medium" may include a single medium or multiple media (e.g., a centralized or distributed database, and/or associated caches and servers) configured to store the one or more instructions 524.

The term "machine-readable medium" may include any medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine-readable medium examples may include solid-state memories, and optical and magnetic media. Accordingly, machine-readable media are not transitory propagating signals. Specific examples of machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks.

The instructions 524 may further be transmitted or received over a communications network 526 using a transmission medium via the network interface device 520 utilizing any one of a number of transfer protocols (e.g., frame relay, Internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMAX®), IEEE 802.15.4 family of standards, Bluetooth®, Bluetooth® low energy technology, ZigBee®, peer-to-peer (P2P) networks, among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 500, and includes digital or analog communications signals or other intangible medium to facilitate communication of such software.

Conventional terms in the fields of computer systems and computer networking have been used herein. The terms are known in the art and are provided only as a non-limiting example for convenience purposes. Accordingly, the interpretation of the corresponding terms in the claims, unless stated otherwise, is not limited to any particular definition.

Although specific embodiments have been illustrated and described herein, it will be appreciated by those of ordinary skill in the art that any arrangement that is calculated to achieve the same purpose may be substituted for the specific embodiments shown. Many adaptations will be apparent to those of ordinary skill in the art. Accordingly, this application is intended to cover any adaptations or variations.

The above description is intended to be illustrative, and not restrictive. For example, the above-described examples (or one or more aspects thereof) may be used in combination with each other. Other embodiments may be used, such as by a person of ordinary skill in the art upon reviewing the above description.

Various non-limiting embodiments have been described. It will be appreciated that suitable alternatives are possible without departing from the scope of the examples described herein. These and other examples are within the scope of the following claims.

The invention claimed is:

1. A system, comprising:
a chemical pump comprising at least one component that is exposed to a chemical composition being pumped during operation of the chemical pump;
a chemical reservoir containing the chemical composition, the chemical reservoir including an electronically readable medium including embedded information corresponding to the chemical composition; and
a database comprising chemical compatibility data including a compatibility between the chemical composition and the at least one component;
wherein an application executing on a portable computing device is operable to:
receive, via a first input device of the portable computing device, a selection including a pump identifier of the chemical pump;
electronically read, using a second input device of the portable computing device, the electronically readable medium to obtain, based on the embedded information, a chemical identifier corresponding to the chemical composition in the chemical reservoir;
query the database using the chemical identifier and the pump identifier;
receive a response to the query from the database, the response including a chemical compatibility between the chemical composition in the chemical reservoir and the at least one component of the chemical pump; and
output, via an output device of the portable computing device, an output indication corresponding to the chemical compatibility between the chemical composition in the chemical reservoir and the chemical pump.

2. The system of claim 1, wherein the database is included in at least one of the chemical pump and the portable computing device.

3. The system of claim 2,
wherein the chemical pump comprises a first wireless communications device;
wherein the portable computing device comprises a second wireless communications device; and
wherein the chemical pump and the portable computing device communicate via the first and second wireless communications devices, respectively, via a wireless communications protocol compatible with both the first and second wireless communications devices.

4. The system of claim 1, wherein the output indication includes at least one of:
an indication that the chemical pump and the chemical composition are compatible;
an indication that the at least one component of the chemical pump and the chemical composition are incompatible; and
an indication that using the chemical composition in the chemical pump may cause a service life of the chemical pump to be reduced.

5. The system of claim 1, wherein the database is stored in at least one server located remotely from both the chemical pump and the portable computing device.

6. The system of claim 1, wherein the at least one component is selected from the group consisting of a seal, a gasket, an O-ring, and combinations thereof.

7. The system of claim 1,
wherein the electronically readable medium is a scannable image; and
wherein the second input device of the portable computing device is an optical input device.

8. The system of claim 7, wherein the scannable image is at least one of a two-dimensional barcode and a three-dimensional barcode.

9. The system of claim 1,
wherein the electronically readable medium is a radio-frequency identification (RFID) tag; and
wherein the second input device of the portable computing device is an RFID reader.

10. The system of claim 1, wherein the embedded information corresponds to at least one of:
an amount of the chemical composition in the chemical reservoir; and
a concentration of the chemical composition in the chemical reservoir.

11. The system of claim 1, wherein the portable computing device is a smartphone, and
wherein both the first input device and the output device is a touchscreen of the smartphone.

12. The system of claim 1, wherein the application is further operable to:
receive operating information from the chemical pump; and
display the operating information on the output device of the portable computing device.

13. The system of claim 1, wherein the chemical reservoir comprises a plurality of reservoirs, each respective reservoir in the plurality comprising a respective chemical composition and a respective electronically readable medium.

14. The system of claim 1,
wherein the at least one component is fabricated from a material selected from the group consisting of: polyvinyl chloride, polyethylene, polypropylene, polyvinylidene fluoride, polytetrafluoroethylene, polyether ether ketone, and combinations thereof; and
wherein the chemical composition is selected from the group consisting of an alkali metal hydroxide, an alkali metal hypochlorite, a peroxide, a mineral acid, an organic acid, a surfactant, and combinations thereof.

15. The system of claim 1, wherein the application is operable to communicate with the chemical pump to cause the chemical pump to prevent an additional volume of the chemical composition from being introduced into the chemical pump.

16. The system of claim 1,
wherein the at least one component comprises a plurality of components, each respective component in the plurality of components being fabricated from a respective material;

wherein the query is to determine the chemical compatibility of each respective material to the chemical composition; and wherein when any component of the plurality of components is determined to not be compatible with the chemical composition, the output indication is that the chemical pump is not compatible with the chemical composition.

17. A method, comprising:

receiving, from a portable computing device, a pump identifier identifying a chemical pump comprising at least one component, the pump identifier corresponding to a selection received via a first input device of the portable computing device;

receiving, from the portable computing device, a chemical identifier identifying a chemical reservoir storing a chemical composition, the chemical identifier corresponding to an input received via a second input device of the portable computing device;

querying, using the pump identifier and the chemical identifier, a database comprising chemical compatibility data including a compatibility between at least one component of the chemical pump and the chemical composition in the chemical reservoir;

receiving a response to the query from the database, the response including the compatibility between the at least one component of the chemical pump and the chemical composition in the chemical reservoir; and transmitting the compatibility to the portable computing device.

18. The method of claim 17, wherein the method is performed by one of:

the chemical pump; and a server that is remote from both the chemical pump and the portable computing device.

19. The method of claim 17, wherein the database is remote from both the chemical pump and the portable computing device.

20. The method of claim 17, wherein the chemical pump and the portable computing device communicate via a Bluetooth wireless communications protocol.

21. A system, comprising:

means for receiving, from a portable computing device, a pump identifier identifying a chemical pump comprising at least one component, the pump identifier corresponding to a selection received via a first input device of the portable computing device;

means for receiving, from the portable computing device, a chemical identifier identifying a chemical reservoir storing a chemical composition;

means for querying, using the pump identifier and the chemical identifier, a database comprising chemical compatibility data including a compatibility between the at least one component of the chemical pump and the chemical composition in the chemical reservoir;

means for receiving a response to the query from the database, the response including a compatibility indication indicating whether the chemical composition is compatible with the at least one component of the chemical pump; and means for transmitting the compatibility indication to the portable computing device.

* * * * *